(12) United States Patent
Daum et al.

(10) Patent No.: US 7,340,509 B2
(45) Date of Patent: Mar. 4, 2008

(54) RECONFIGURABLE APPLIANCE CONTROL SYSTEM

(75) Inventors: Wolfgang Daum, Erie, PA (US); William Hull Bicknell, Louisville, KY (US)

(73) Assignee: General Electric Company, Schenectady, NY (US)

( * ) Notice: Subject to any disclaimer, the term of this patent is extended or adjusted under 35 U.S.C. 154(b) by 675 days.

(21) Appl. No.: 10/197,702

(22) Filed: Jul. 18, 2002

(65) Prior Publication Data

US 2004/0015570 A1    Jan. 22, 2004

(51) Int. Cl.
   *G06F 15/177* (2006.01)
(52) U.S. Cl. ............... 709/220; 709/221; 709/222
(58) Field of Classification Search ........ 709/220–222; 710/8.1; 713/1, 2, 100
   See application file for complete search history.

(56) References Cited

U.S. PATENT DOCUMENTS

| | | | |
|---|---|---|---|
| 5,051,720 A | | 9/1991 | Kittirutsunetorn |
| 5,436,510 A | | 7/1995 | Gilbert |
| 5,467,263 A | | 11/1995 | Gilbert |
| 5,530,322 A | * | 6/1996 | Ference et al. ............ 315/295 |
| 5,570,085 A | | 10/1996 | Bertsch |
| 5,576,700 A | | 11/1996 | Davis et al. |
| 5,579,482 A | * | 11/1996 | Einkauf et al. ............ 709/220 |
| 5,621,662 A | * | 4/1997 | Humphries et al. ........ 700/276 |
| 5,625,863 A | | 4/1997 | Abraham |
| 5,630,204 A | | 5/1997 | Hylton et al. |
| 5,675,811 A | * | 10/1997 | Broedner et al. ........... 713/323 |
| 5,677,603 A | * | 10/1997 | Speirs et al. .............. 315/324 |
| 5,684,826 A | | 11/1997 | Ratner |
| 5,706,191 A | | 1/1998 | Bassett et al. |
| 5,761,092 A | | 6/1998 | Bunting |
| 5,777,769 A | | 7/1998 | Coutinho |
| 5,818,821 A | | 10/1998 | Schurig |
| 5,838,226 A | | 11/1998 | Houggy et al. |
| 5,841,360 A | * | 11/1998 | Binder ................. 340/825.52 |
| 5,842,032 A | | 11/1998 | Bertsch |
| 5,848,054 A | | 12/1998 | Mosebrook et al. |
| 5,856,776 A | | 1/1999 | Armstrong et al. |
| 5,870,016 A | | 2/1999 | Shrestha |
| 5,877,957 A | * | 3/1999 | Bennett ...................... 700/86 |
| 5,892,758 A | | 4/1999 | Argyroudis |
| 5,898,387 A | | 4/1999 | Davis et al. |
| 5,903,326 A | | 5/1999 | Suman et al. |
| 5,905,442 A | | 5/1999 | Mosebrook et al. |
| 5,920,476 A | * | 7/1999 | Hennessey et al. ........... 700/17 |
| 5,922,047 A | | 7/1999 | Newlin et al. |
| 5,924,892 A | | 7/1999 | Ferracina |

(Continued)

OTHER PUBLICATIONS

X10Website, www.x10.com/products/x10_ck11a.htm, pp. 1-6, Dec. 23, 2005.

*Primary Examiner*—John Follansbee
*Assistant Examiner*—Saket Daftuar
(74) *Attorney, Agent, or Firm*—George L. Rideout, Esq.; Armstrong Teasdale LLP

(57) ABSTRACT

A reconfigurable appliance control system includes a dedicated appliance control (DAC) for controlling operation of an appliance. The system further includes an appliance communication control (ACC) for communicating with at least one appliance. The system includes an appliance communication connection for interfacing the ACC to the appliance. The system also includes an external host control (EHC) for communicating with a remote system. The system further includes a host communication connection for interfacing the external host control with the ACC.

30 Claims, 9 Drawing Sheets

U.S. PATENT DOCUMENTS

| | | | |
|---|---|---|---|
| 5,927,598 A * | 7/1999 | Broe ........................ 236/46 R |
| 5,933,071 A | 8/1999 | Brown |
| 5,938,742 A * | 8/1999 | Faddell et al. ................. 710/9 |
| 5,938,757 A * | 8/1999 | Bertsch ....................... 712/36 |
| 5,940,387 A | 8/1999 | Humpleman |
| 5,949,327 A | 9/1999 | Brown |
| 5,952,914 A | 9/1999 | Wynn |
| 5,963,406 A | 10/1999 | Neiger et al. |
| 5,994,998 A | 11/1999 | Fisher et al. |
| 6,002,669 A | 12/1999 | White |
| 6,006,167 A | 12/1999 | Bunting |
| 6,011,579 A | 1/2000 | Newlin |
| 6,014,386 A | 1/2000 | Abraham |
| 6,040,759 A | 3/2000 | Sanderson |
| 6,052,750 A | 4/2000 | Lea |
| 6,058,355 A | 5/2000 | Ahmed et al. |
| 6,059,195 A * | 5/2000 | Adams et al. ............ 236/20 R |
| 6,061,604 A | 5/2000 | Russ et al. |
| 6,085,236 A | 7/2000 | Lea |
| 6,088,205 A | 7/2000 | Neiger et al. |
| 6,129,284 A * | 10/2000 | Adams et al. ............ 236/21 R |
| 6,182,130 B1 * | 1/2001 | Dolin et al. ................. 709/221 |
| 6,275,166 B1 * | 8/2001 | del Castillo et al. ......... 340/5.1 |
| 6,353,861 B1 * | 3/2002 | Dolin et al. ................. 719/318 |
| 6,453,687 B2 * | 9/2002 | Sharood et al. ............... 62/127 |
| 6,466,234 B1 * | 10/2002 | Pyle et al. .................. 715/771 |
| 6,526,581 B1 * | 2/2003 | Edson ........................ 725/74 |
| 6,571,089 B1 * | 5/2003 | Richards et al. ............ 455/266 |
| 6,587,739 B1 * | 7/2003 | Abrams et al. ............... 700/83 |
| 6,640,141 B2 * | 10/2003 | Bennett ....................... 700/19 |
| 6,823,223 B2 * | 11/2004 | Gonzales et al. ............. 700/86 |
| 6,862,498 B2 * | 3/2005 | Davis et al. ................. 700/295 |
| 6,873,245 B2 * | 3/2005 | del Castillo et al. ......... 340/3.5 |
| 6,882,712 B1 * | 4/2005 | Iggulden et al. ....... 379/102.03 |
| 6,919,790 B2 * | 7/2005 | Kanazawa ................. 340/5.21 |
| 2003/0025395 A1 * | 2/2003 | Peterson ..................... 307/11 |

* cited by examiner

RECONFIGURABLE APPLIANCE CONTROL SYSTEM

BACKGROUND OF THE INVENTION

The present invention generally relates to an appliance control system, and in particular relates to a reconfigurable appliance control system that may be remotely activated and updated.

The typical home, office building, or commercial establishment contains several appliances, including refrigerators, microwave ovens, ovens, stoves, heating systems, cooling systems, and the like. Modem appliances are much more sophisticated than their early counterparts, and often include microcontrollers or microprocessors that allow the appliance to be programmed, reprogrammed, and provide diagnostic information, as examples.

The Internet has given rise to worldwide connectivity for many types of devices. Appliances, however, only have traditional standalone capability. Three primary communication technologies may be used to provide appliance connectivity: hard wiring, power line carrier (PLC), and wireless.

Hard wiring (including for example RS-232, RS-485, Ethernet, USB, HomePNA, and industrial twisted pair networks) offers superior performance capability (when measured in terms of speed, noise immunity, and the like) at an effective cost. However, a drawback is that additional wiring is required to a home or business. Hard wiring thus poses the significant problem of retrofitting networked appliances into existing homes and businesses and increases cost for new structures.

PLC uses a 120V or 240V AC power line as a carrier for networking data by modulating the networking data on a high frequency carrier. The high frequency carrier is usually between 100-400 kHz to keep it below the range of FCC regulation. Although older technologies, such as X10, have achieved some market acceptance in lighting applications, they are generally deemed too slow and unreliable for major appliance networking needs. However, newer PLC technologies, such as CEBus and Lon Works, are now commercially available and provide improved data rates and noise immunity at reasonable cost.

Wireless technologies (such as IEEE 802.11, Bluetooth, HomeRF, and the like) solve the problem of additional wiring by modulating data onto a radio frequency carrier (e.g., at 2.4 GHz) that is broadcast via antenna to desired recipients. Wireless approaches may offer higher bandwidth than PLC technologies currently available, but they do so at a higher cost. Furthermore, since most major appliances are packaged in a sheet steel enclosure (which makes an effective RF shield), antenna placement may be difficult. Cost effective wireless technologies are also subject to distance limitations, potential interference, and poor reception zones that can often render their use in the home with large, immobile appliances impossible.

Previously, upgrading an appliance required the appliance owner to incur the time and expense of replacing the entire appliance itself. Such an approach was, of course, unduly wasteful, particularly in light of the more sophisticated microcontroller based designs of modem appliances. Nevertheless, it was not previously possible to perform appliance upgrades using, for example, any of the physical network media identified above.

BRIEF SUMMARY OF THE INVENTION

In one aspect, a method for reconfiguring an appliance control system is provided. The method includes generating an upgrade message at an external host controller (EHC). The EHC may serve as a controller or as a gateway for remote control systems. The upgrade message is then transmitted to an appliance communication controller (ACC). The ACC then reprograms a dedicated appliance controller (DAC) using the upgrade message. In an exemplary embodiment, the DAC is located inside the appliance, and transmission between the EHC and ACC is accomplished with a power line carrier system, while transmission between the ACC and the DAC is accomplished with a serial communication system.

In another aspect, a reconfigurable appliance control system is provided. The system includes a DAC for controlling operation of an appliance and responsive to upgrade messages. The system further includes an ACC for communicating with the appliance. The system further includes an appliance communication connection for interfacing the ACC to the appliance. The system also includes an EHC for communicating with a remote system and a communication connection for interfacing the external host control with the ACC.

DETAILED DESCRIPTION OF THE INVENTION

Figure 1:
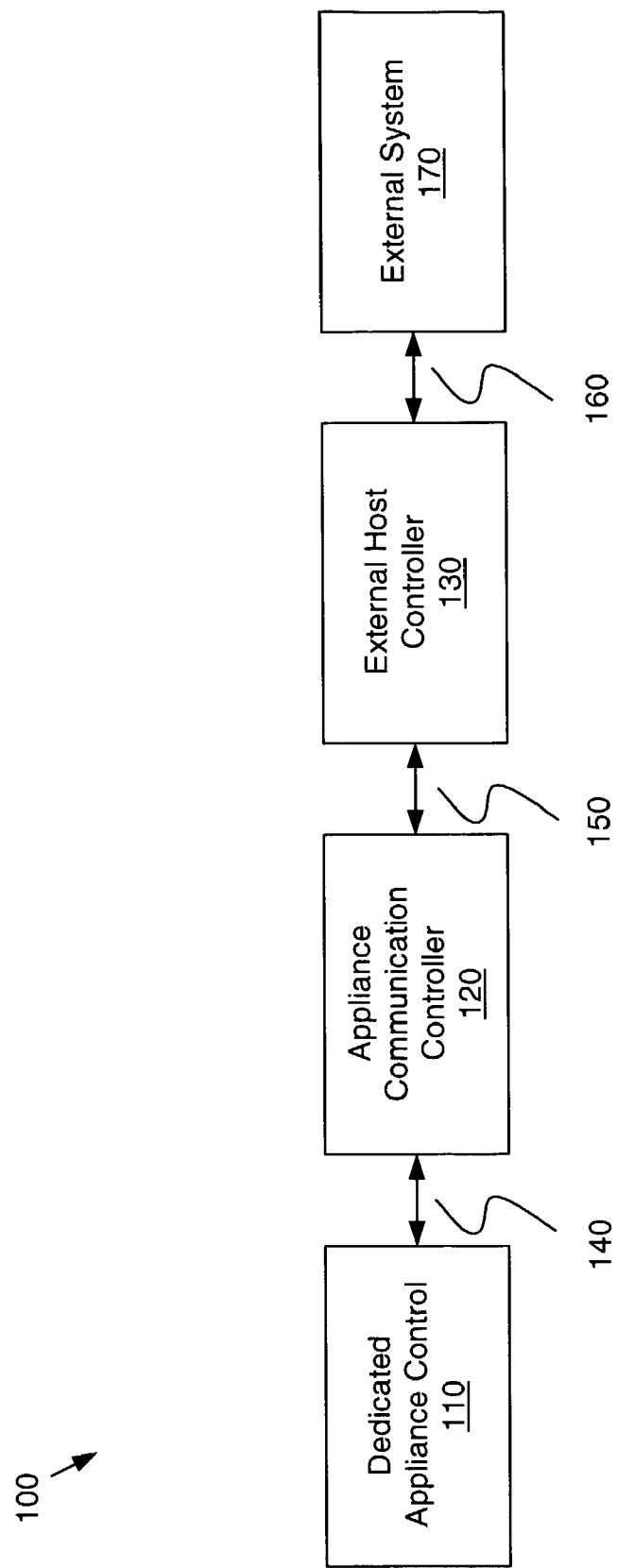
FIG. 1 illustrates a reconfigurable appliance control system.

FIG. 1 illustrates a reconfigurable appliance control system 100. The reconfigurable appliance control system 100 includes a Dedicated Appliance Controller (DAC) 110, an Appliance Communication Controller (ACC) 120, and an External Host Controller (EHC) 130. The DAC 110 and the ACC 120 are connected via an appliance communication connection 140 (e.g., a serial connection). The EHC 130 and ACC 120 are connected via a host communication connection 150 (e.g., a PLC connection), while the EHC 130 is connected to an external system 170 via the external connection 160 (e.g., a network connection). The EHC 130 may be, as examples, a personal computer, laptop computer, remote control operating center, dedicated service tool, and the like.

Figure 2:
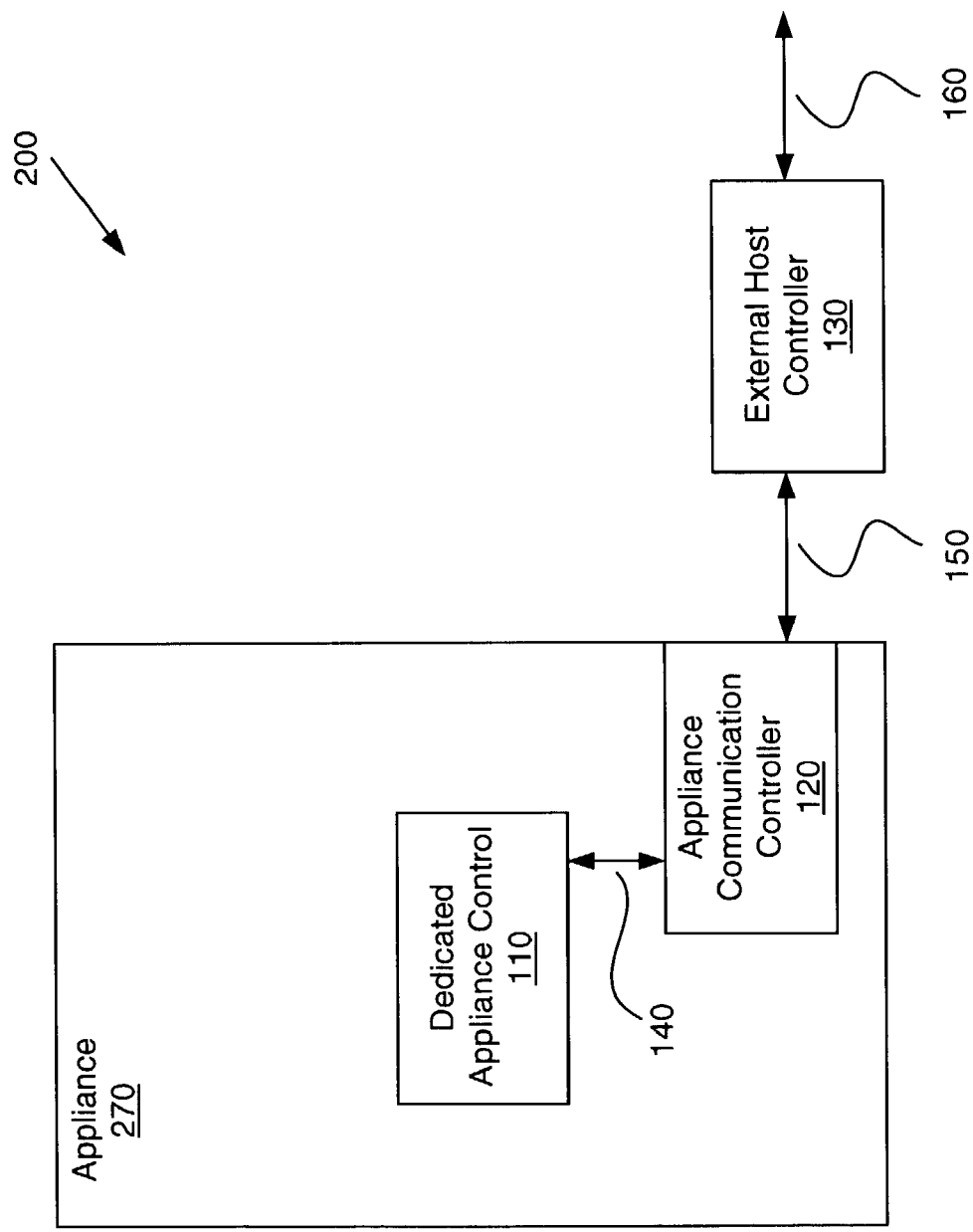
FIG. 2 shows an appliance with a reconfigurable appliance control system.

Turning to FIG. 2, the DAC 110 and ACC 120 are, in one embodiment, contained within an appliance 270 (e.g., a refrigerator, oven, stove, air conditioner, heater, and the like). The EHC 130 may be located anywhere it can connect to the communication link 160 (e.g., to the Internet via modem, network card, and the like).

Figure 3:
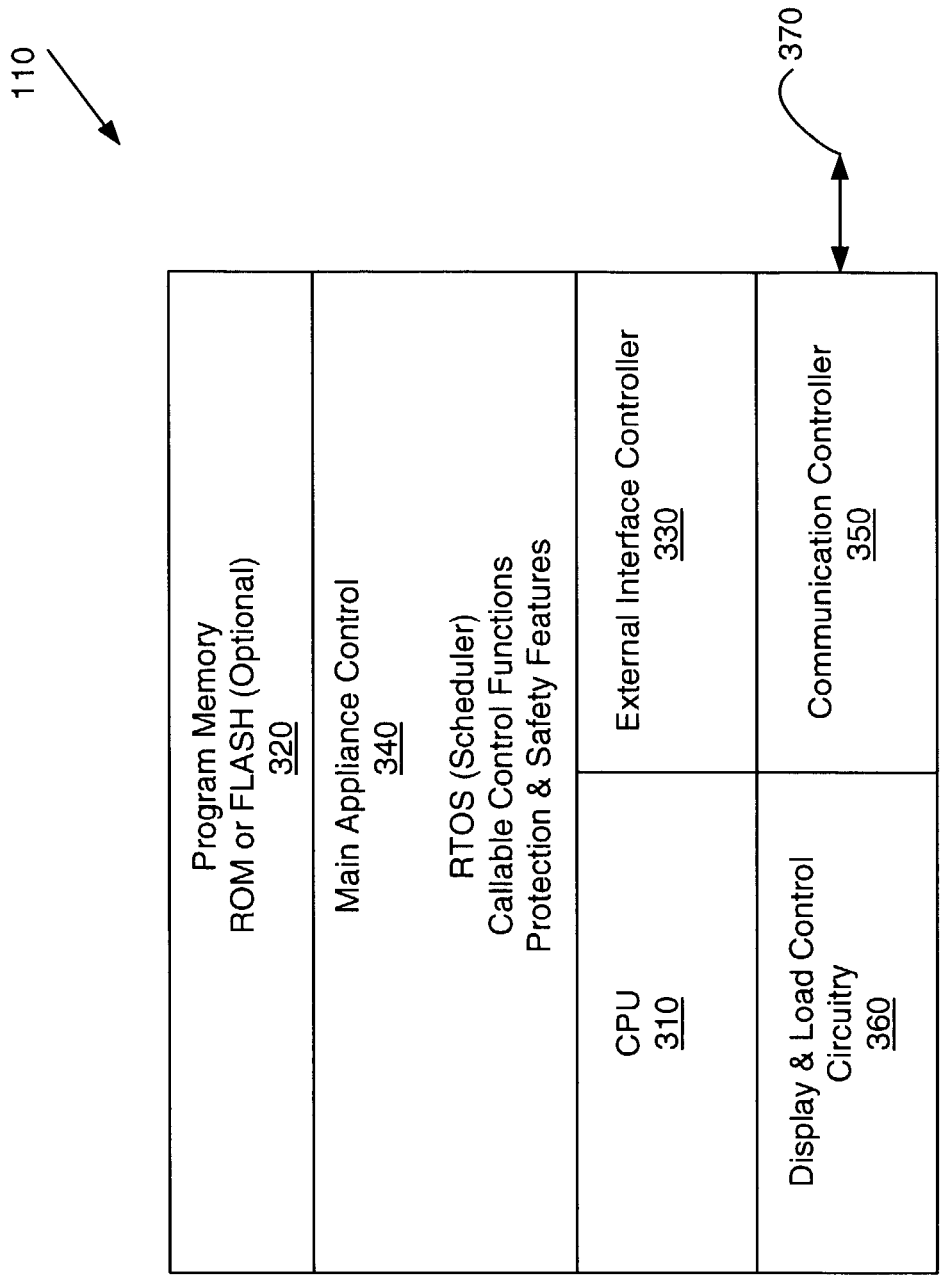
FIG. 3 depicts a dedicated appliance controller.

The DAC 110 functions primarily as an appliance controller and, in one embodiment, is implemented as shown in FIG. 3. As shown in FIG. 3, the DAC 110 includes a central processing unit (CPU) 310, local memory 320 RAM (random access memory) and ROM (read-only memory) (optionally implemented as reprogrammable FLASH memory), at least one external interface controller 330 (e.g., connected to appliance relays, sensors, and the like), and an application program 340. The external interface 330 provides a means to interface to other semi-autonomous sub-systems (e.g., a variable speed drive) present in an appliance. The application program 340 includes a scheduler, callable control functions, and protection and safety features. The application program 340 provides for the fundamental appliance specific operation such as cooking timing, wash cycle operation, and the like.

The DAC 110 may also accept modifications to its operating functions and algorithms by reprogramming the DAC 110 software 340. With the addition of a communication interface controller 350, the DAC 110 may be reprogrammed or directed to perform specific functions via commands through the command interface 350. The DAC 110 also includes display and user input circuitry 360. The display and user input circuitry 360 provides for user interaction and operation of the appliance such as setting the appliance clock, selection of cycles and the like. The DAC 110 communicates with the ACC 120 via a communication link 370 (e.g., a serial communication bus).

Figure 4:
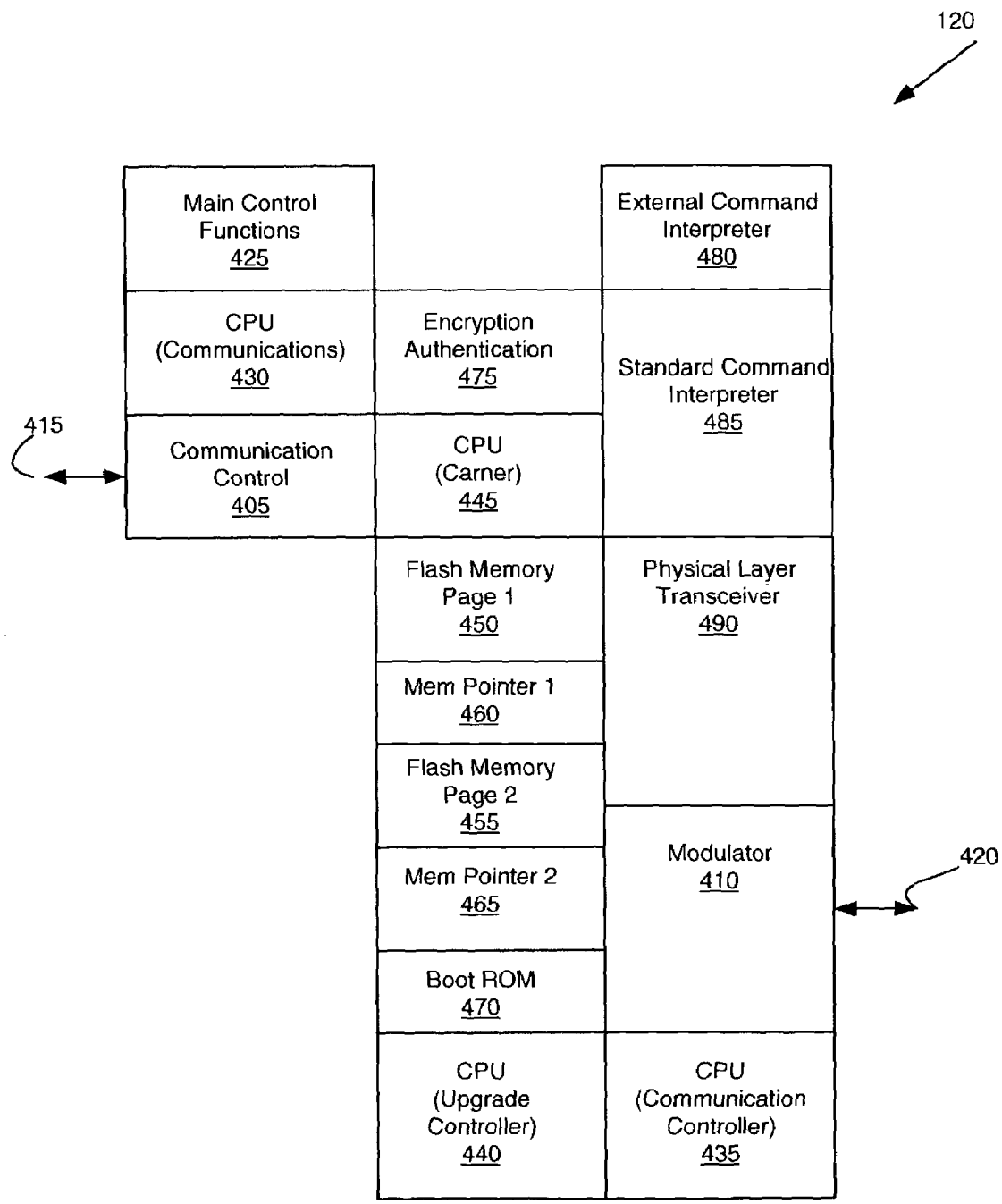
FIG. 4 shows an appliance communication controller.

The ACC 120 acts as an interface between the DAC 110 and the EHC 130. The ACC 120 may act as a command interpreter, an information buffer, a data translator, and a master to the slave DAC 110. In one embodiment, and as shown in FIG. 4, the ACC 120 includes two communications interfaces 405, 410. The ACC 120 also includes a main control module 425, a communications CPU 430, a communication controller CPU 435, an upgrade controller CPU 440, and a data encryption CPU 445. The ACC 120, in one embodiment, further includes a first page of Flash memory 450, a second page of flash memory 455, first page memory pointer 460, a second page memory pointer 465, and a Boot ROM 470. The ACC 120 further includes an encryption authentication module 475, an external command interpreter 480, a standard command interpreter 485, and a physical layer transceiver 490. One or more of the functional blocks such as the main control function and encryption function may be combined into a single function. Also, one or more of the CPU functions such as the communication CPU and encryption CPU can be combined into a single CPU. The physical implementation of the above functional blocks can be accomplished in discrete devices or a single device such as a system on a chip or custom application specific integrated circuit (ASIC).

The main control module 425 provides for the scheduling and correct interoperation of all other functions and tasks in the ACC. The main control module 425 may be implemented as a software module as part of the total firmware of the ACC or as a real time operating system such as UNIX, Windows CE, and the like. The communications CPU 430 provides for processing of the communication system instructions as well as digital signal processing functions to enhance the signal to noise ratio of the communicated data forwarded to the DAC 110, the Encryption CPU 445 running under the encryption and authentication firmware module control 475, the External Command Interpreter 480, and to the Standard Command Interpreter 485. The External Command Interpreter 480 and the Standard Command Interpreter 485 may be combined into the same functional code. The communications CPU 430 may be implemented as a stand alone device such as the H8-3644 as manufactured by Hitachi Corporation or as a comprehensive CPU or ASIC as mentioned above. The communication controller CPU 435 provides for the execution of the specific communication instructions as mentioned above. The communication controller CPU 435 may be implemented as a stand alone device such as the H8-3644 as manufactured by Hitachi Corporation, a digital signal processor TMS320C20 as manufactured by Texas Instruments or as part of a comprehensive CPU as mentioned above. The upgrade controller CPU 440 controls the sequence of steps that allow for the buffering and manipulation of the upgraded ACC microcode. The upgrade controller CPU 440 may be implemented as a stand alone device such as the H8-3644 as manufactured by Hitachi Corporation or as part of an overall CPU as mentioned above.

The Encryption CPU 445 provides for the data authentication and encryption function code execution. The encryption authentication module 475 verifies authenticity such as that provided by the Pretty Good Privacy (PGP) protocol for public key authentication and encryption of a transmitted message (for example, provided by Rijndael encryption code and alternatives). The Encryption CPU 445 may be implemented as a stand alone device such as the H8-3644 as manufactured by Hitachi Corporation or as part of a comprehensive CPU as mentioned above. The encryption authentication module 475 may be implemented as a stand alone function or integrated into the firmware code. In an alternate embodiment, the encryption CPU 445 and encryption authentication module 475 may be omitted to reduce cost and complexity.

The external command interpreter 480 interprets commands received from an external host, then translates and sequences them to appliance specific commands. The external command interpreter 480 may be implemented as a stand alone module or integrated into the ACC firmware. The standard command interpreter 485 interprets and forwards the appliance specific commands by passing these commands directly to the DAC 110. The standard command interpreter 485 performs a mapping function that in its most basic case is a one-to-one mapping. In an alternate embodiment the mapping function may be more complicated and include translation of command reference calls, command parameter duration, and the like. The standard command interpreter 485 may be implemented as a stand alone module or integrated into the ACC firmware. In alternate embodiments, the external command interpreter may be omitted and only the standard command interpreter used where no further enhancement of the appliance functionality is desired. The external command interpreter may be omitted if the whole functionality of the DAC and ACC are upgraded and exchanged, making the external command interpreter unnecessary.

The physical layer transceiver 490 allows the translation of physical signals as received and transmitted by the ACC to logical signals. The physical layer transceiver 490 may be implemented as a stand alone device such as RS232 transceiver or integrated into the overall ACC functionality (for example, in an ASIC).

The communication connection 405 provides a serial connection 415 between the ACC 120 and the DAC 110. In one embodiment, the serial connection 415 implements certain aspects of a serial communication bus standard, as described below. The communication connection 410 includes an external communication link 420, for example, a power line carrier.

The serial connection 415 may be implemented, for example, as a serial communication bus interface between the ACC 120 and the DAC 110. Where there are multiple dedicated appliance controllers, the serial bus 415 uses an arbitration scheme to allow all the devices to communicate over the bus 415 without data transmission collisions, as explained below.

The communication link 420 between the ACC 120 and the EHC 130 may be implemented in many forms, such as power line carrier (PLC), infrared (IR), IEEE 802.11, hardwire, and the like. In an exemplary embodiment, the communication link 420 is implemented as a power line carrier interface. The ACC 120 may mitigate data interruption through retention of information, such as status and completeness of data transfers over the communication link 420. Alternatively, large data transmissions (such as a new operational program) may be verified via a CRC (cyclic redundancy check) or checksum test. If a data interruption occurs, the entire data packet may be retransmitted. In one embodiment, the communication link 420 supports multiple devices, such as refrigerator, laundry, and cooking appliances and the like.

The ACC 120 acts as a command interpreter for data from the gateway EHC 130. The ACC 120 accepts low level functions (such as On, Off, Status, Functions Selection, and the like). Low level commands or functions allow direct control of the appliance. The ACC 120 communicates the low level functions to the DAC 110. Some functions may be converted into a machine specific format or native appliance command set before being transmitted to the DAC 110 (e.g., functions for activation and deactivation of a water valve solenoid). In an alternative embodiment, the ACC 120 is employed as an extended command interpreter. As an extended command interpreter, the ACC 120 may implement new algorithms and/or functions by using low level commands as building blocks to perform new functions.

The ACC 120 may also act as an information (program) buffer to reprogram the DAC 110. The ACC 120 receives a new appliance control program via the high bandwidth communication link. The new appliance control program is stored into a memory page in the ACC 120. Once the new appliance control program has been received, the program is verified for correctness. The ACC 120 then checks the status of the DAC 110 to insure no upgrading occurs during use of the appliance. If the appliance is not in use, the ACC 120 may begin transmitting the new program to the DAC 110. During the transmission process, the ACC 120 retains a pointer indicating what part of the program data is currently being transmitted. Retaining a pointer allows for interruption and resumption of the data transmission without having to retransmit the entire program.

The ACC 120 may also function as a data translator. The ACC 120 may obtain, correlate, and track statistics with respect to the operation of the appliance(s) to which it is connected. The statistics obtained from the appliance(s) may be used for maintenance purposes (such as scheduling maintenance). The statistics may also be used to track usage of appliances or for financial accounting purposes. The statistics are, in one embodiment, accumulated by the ACC 120 until the statistics are uploaded to a remote host for analysis.

In an alternative embodiment, the ACC 120 may be employed as a master to the DAC 110 (slave) controller. New control algorithms are retained and executed from within the ACC 120, rather than being downloaded into the DAC 110. The ACC 120 issues commands instructing the DAC 110 to activate the appropriate loads within the appliance. The ACC 120 employs the functionality of the DAC 110 as in some embodiments (such as DAC 110 sensors, load actuators, display capability, and the like). The DAC's 110 normal safety and protection functions remain enabled to protect the appliance and the user. A high-speed communication bus allows efficient communication between the ACC 120 and DAC 110.

Figure 5:
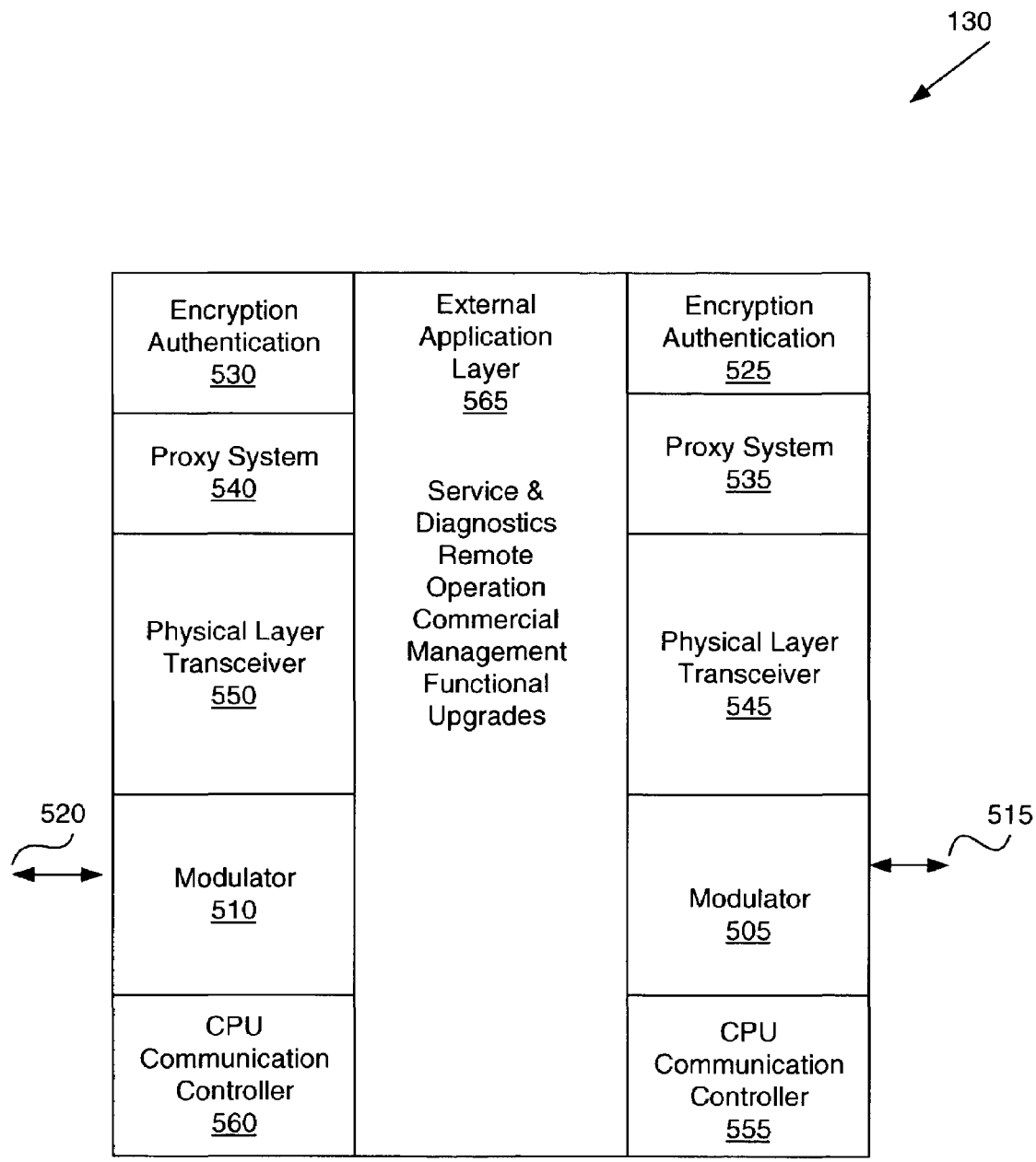
FIG. 5 illustrates an external host controller.

FIG. 5 illustrates an implementation of an external host controller (EHC) 130. The EHC 130 includes the modulators 505, 510 and communication connections 515, 520. The EHC 130 further includes encryption authentication modules 525, 530, proxy systems 535, 540, physical layer transceivers 545, 550, and CPU communication controllers 555, 560. The EHC 130 further includes an external application layer 565. The external application layer 565 allows service and diagnostics, remote operation, management, function, and upgrades. The external application layer 565 may be implemented as a stand alone module or part of the external home automation system such as the X10 home automation code as provided by X10 Activehome available at www.x10.com.

The communication controller CPU 555, 560 provides for the execution of the specific communication instructions as mentioned above. The communication controller CPU 555, 560 may be implemented as a stand alone device such as the H8-3644 as manufactured by Hitachi Corporation, a digital signal processor TMS320C20 as manufactured by Texas Instruments or as part of a comprehensive CPU combining elements 555 and 560. The physical layer transceiver 545, 550 performs translation of physical signals as received and transmitted by the EHC 130 to logical signals. The physical layer transceiver 545, 550 may be implemented as a stand alone device such as RS232 transceiver or integrated into the overall ACC functionality via an ASIC. The proxy systems 535, 540 may be implemented as a proxy server providing an address translation service, thus expanding a single logical address to multiple physical addresses, for example, in a manner consistent with Internet Protocol systems. The Encryption CPU 445 provides data authentication and encryption function code execution. The encryption authentication module 475 verifies the authenticity such as provided by the PGP protocol for public key authentication and encryption of a transmitted message (for example, according to Rijndael encryption code and alternatives). The Encryption CPU 525, 530 may be implemented as a stand alone device such as the H8-3644 as manufactured by Hitachi Corporation or as part of a comprehensive CPU as noted above. The encryption authentication module 525, 530 may be implemented as a stand alone function or integrated into the firmware of the EHC 130. It is understood that in an alternate exemplary embodiment, the encryption CPU 525 or 530 and the corresponding encryption authentication module 525 or 530 may be omitted.

The communication connection 505 provides a communication link 515 to external devices. The communication link 515 may be a modem connection, hardwire, wireless, and the like. The communication connection 510 provides a communication link 520 between the EHC 130 and the ACC 120. The communication link 520 between the ACC 120 and the EHC 130 may be implemented in many forms, such as power line carrier (PLC), infrared (IR), IEEE 802.11, hardwire, and the like.

The communication link 520 includes a power line carrier interface. The ACC 120 may mitigate data interruption through retention of information, such as status and completeness of data transfers over the communication link 520. Alternatively, large data transmissions (such as a new operational program) may be verified via a CRC (cyclic redundancy check) or checksum test. If a data interruption occurs, the entire data packet may be retransmitted. In one embodiment, the communication link 520 supports multiple devices, such as refrigerator, laundry, and cooking appliances and the like.

In one embodiment, the EHC 130 incorporates a transceiver to communicate with at least one appliance via the host communication connection 150. In a standalone embodiment, the EHC 130 may generate instructions to operate an appliance. The standalone EHC 130 also may generate instructions to modify the control of an appliance. In a standalone embodiment, the EHC 130 includes a user interface. The user interface allows user friendly appliance control from a single location. The user interface may be implemented as Windows Application as provided by the X10 Activehome system mentioned above. In an alternative embodiment, the EHC 130 further includes a second high-speed communication port for remote communication. The EHC 130 may act as a gateway to external networks, including the Internet. In an exemplary embodiment, a remote system 170 may access the EHC 130. Data encryption algorithms and proxy protocols may be used for remote communication with the EHC 130. Remote communication allows remote diagnostics and remote function upgrade from a facility such as a factory producing the appliance, authorized service center, and the like. In one embodiment, a power line carrier (PLC) is used to transmit data over an AC power line.

In an exemplary embodiment, data is transmitted by modulating the data on a high frequency carrier above the power line carrier. In one embodiment, the modulated data is a sinusoid wave that is transmitted along with AC power through the power lines. The high frequency carrier is usually between 100-400 kHz to keep it below the range of FCC regulation. Example PLC implementation include the X10 and CEBUS protocols as well known in the art.

In another embodiment, at least certain aspects of a serial communication bus are used when communicating between two or more microcontrollers, or other devices distributed among one or more platforms (e.g., an appliance and a communications interface). The serial communications bus, in one embodiment, is a single line bus comprising a physical layer, a data-link layer, and an application layer. The serial communication bus allows on demand communications in a multi-master environment. The multi-master environment allows any device in the system to request information or actions from any other device in the system at any time once the device successfully attains bus control through arbitration.

The serial communication bus standard uses a collision detection technique to determine when a communications port is free or in use and when a collision has occurred. A collision occurs when two or more masters attempt to use the communications bus at the same time. A collision may be detected since the transmit and receive ports on one of the microcontrols are connected to the same bus wire. Control of interrupts associated with the communications port allows collision detection to be an interrupt driven activity. The protocol used is a byte-oriented protocol. A higher level protocol determines the length and content of packets comprising messages. The following state table (Table 1) describes the relevant function of the serial communication protocol.

TABLE 1

Physical Communication Protocol State Table

| State | Action | Result | Next State |
|---|---|---|---|
| 1 | Are there bytes to send? | Yes | 2 |
|   |   | No | 1 |
| 2 | Check bus activity | Busy | 6 |
|   |   | Free | 3 |
| 3 | Send Byte |   | 4 |
| 4 | Does byte sent = byte received? | Yes | 1 |
|   |   | No | 5 |
| 5 | Delay 3 to 8 byte times | Complete | 1 |
| 6 | Delay 5 byte times | Complete | 1 |

In the two delay states, 5 and 6, a byte time is defined as the amount of time required to transmit a single byte on the communications bus. The byte time is determined by the baud rate, number of data bits, number of stop bits, and a parity bit, if used.

The variable delay period shown in state five is intended to make the restart delay time random. If a collision does occur, the two bus masters, in one embodiment, do not delay the same amount of time before retrying transmission. The variable delay may reduce the possibility of subsequent collisions by the two masters. The variable delay period may be determined by a pseudo random number process, for example.

The data-link layer defines information that moves across the bus in any given packet of data. The bytes defined in the data-link layer do not necessarily have a one to one correlation with the bytes in the physical layer. Many physical devices have bits in the physical layer that implement the functions of some of the bytes in the data-link layer. The data-link layer may be generic so that the data-link layer and the application layer may not need to change even if the physical device is redesigned. The data-link layer of the communication system is appropriate for such technologies as UART multi-drop environment.

The protocol may be used in a master/slave environment, for example, in a small network where one device can be a master through one communication cycle and then become a slave for another communication cycle.

A command is used by a master device to request action from a slave. A command packet of data may be structured as follows in Table 2 (note that the number of bytes may vary depending on need):

TABLE 2

Command Data Packet

| STX | Address | Packet Length | Command | Data | CRC | ETX |
|---|---|---|---|---|---|---|
| 1 byte | 1 byte | 1 byte | 1 byte | N bytes | 2 bytes | 1 byte | where, in one embodiment:

STX (start transmission) is one byte with a value of 0×02. To determine whether an STX is valid, the protocol checks whether an ACK (acknowledgment) byte follows and if yes, the 0×02 is in the middle of a transmission and should not be interpreted as an STX;

Address is one byte and each device has one effective address;

Packet Length is the number of bytes in the packet including STX, Address, Packet Length, Command, Data, CRC, and ETX. The packet length value is 7−n, where n is the number of data bytes;

Command is one byte defined by the application layer;

Data may be zero, one, or multiple bytes as defined in the application layer, except for the case of a request in which the first data byte will be the master's address so the slave will know which device to respond to;

CRC (cyclic redundancy code) is a 16-bit CRC. The CRC is computed on all bytes of a packet except the STX, the CRC byte pair and the ETX; and ETX (end transmission) is one byte with a value of 0×03.

The protocol, including ACKs, is given in Tables 1-3. At any point in the process where an ACK can be sent a NAK (no acknowledgment) may be sent instead. If a NAK is transmitted, the communication sequence is aborted at that point. The master then has an option of re-starting the sequence (application dependent). A NAK is, in one embodiment, transmitted in response to a received ETX when the computed packet CRC does not match the transmitted packet CRC. An additional ACK is sent at the end of each packet.

In one embodiment, an ACK is one byte with a value of 0×06 and/or a NAK is one byte with a value of 0×15.

Tables 3-5 assume that time increments with each row of the table. Up to hundreds of milliseconds of delay may be tolerated for any expected event, such as, an ACK response to a transmitted byte, or the reception of the next byte of an incomplete packet. The arrow indicates the data direction. For the request sequence and response to request sequence, the first data byte is the transmitter's address.

TABLE 3

Command Sequence

| Master | | Slave | |
|---|---|---|---|
| STX → | [0x02] | | |
| Slave Address → | 1 byte | | |
| | | [0x06] | ← ACK |
| Packet Length → | 1 byte | | |
| | | [0x06] | ← ACK |
| Command → | 1 byte | | |
| | | [0x06] | ← ACK |
| Data Byte 1 → | 1 byte | | |
| | | [0x06] | ← ACK |
| Data Byte 2→ | 1 byte | | |
| | | [0x06] | ← ACK |
| Data Byte n→ | 1 byte | | |
| | | [0x06] | ← ACK |
| CRC MSB → | 1 byte | | |
| | | [0x06] | ← ACK |
| CRC LSB → | 1 byte | | |
| | | [0x06] | ← ACK |
| ETX → | [0x03] | | |
| | | [0x06] | ← ACK |
| | | [0x06] | ← ACK |

TABLE 4

Request Sequence

| Requestor | | Requestee | |
|---|---|---|---|
| STX → | [0x02] | | |
| Request Address → | 1 byte | | |
| | | [0x06] | ← ACK |

TABLE 4-continued

Request Sequence

| Requestor | | Requestee | |
|---|---|---|---|
| Packet Length → | 1 byte | | |
| | | [0x06] | ← ACK |
| Request Command → | 1 byte | | |
| | | [0x06] | ← ACK |
| Data Byte 1- Requestor's Address (Transmitter) → | 1 byte | | |
| | | [0x06] | ← ACK |
| Data Byte 2 → | 1 byte | | |
| | | [0x06] | ← ACK |
| Data Byte n → | 1 byte | | |
| | | [0x06] | ← ACK |
| CRC MSB → | 1 byte | | |
| | | [0x06] | ← ACK |
| CRC LSB → | 1 byte | | |
| | | [0x06] | ← ACK |
| ETX → | [0x03] | | |
| | | [0x06] | ← ACK |
| | | [0x06] | ← ACK |

TABLE 5

Response to Request Sequence

| Requestee | | Requestor | |
|---|---|---|---|
| STX → | [0x02] | | |
| Requestor's Address → | 1 byte | | |
| | | [0x06] | ← ACK |
| Packet Length → | 1 byte | | |
| | | [0x06] | ← ACK |
| Command to which Requestee is Responding → | 1 byte | | |
| | | [0x06] | ← ACK |
| Data Byte 1- Requestee's Address (Transmitter) → | 1 byte | | |
| | | [0x06] | ← ACK |
| Data Byte 2 → | 1 byte | | |
| | | [0x06] | ← ACK |
| Data Byte n → | 1 byte | | |
| | | [0x06] | ← ACK |
| CRC MSB → | 1 byte | | |
| | | [0x06] | ← ACK |
| CRC LSB → | 1 byte | | |
| | | [0x06] | ← ACK |
| ETX → | [0x03] | | |
| | | [0x06] | ← ACK |
| | | [0x06] | ← ACK |

Figure 6:
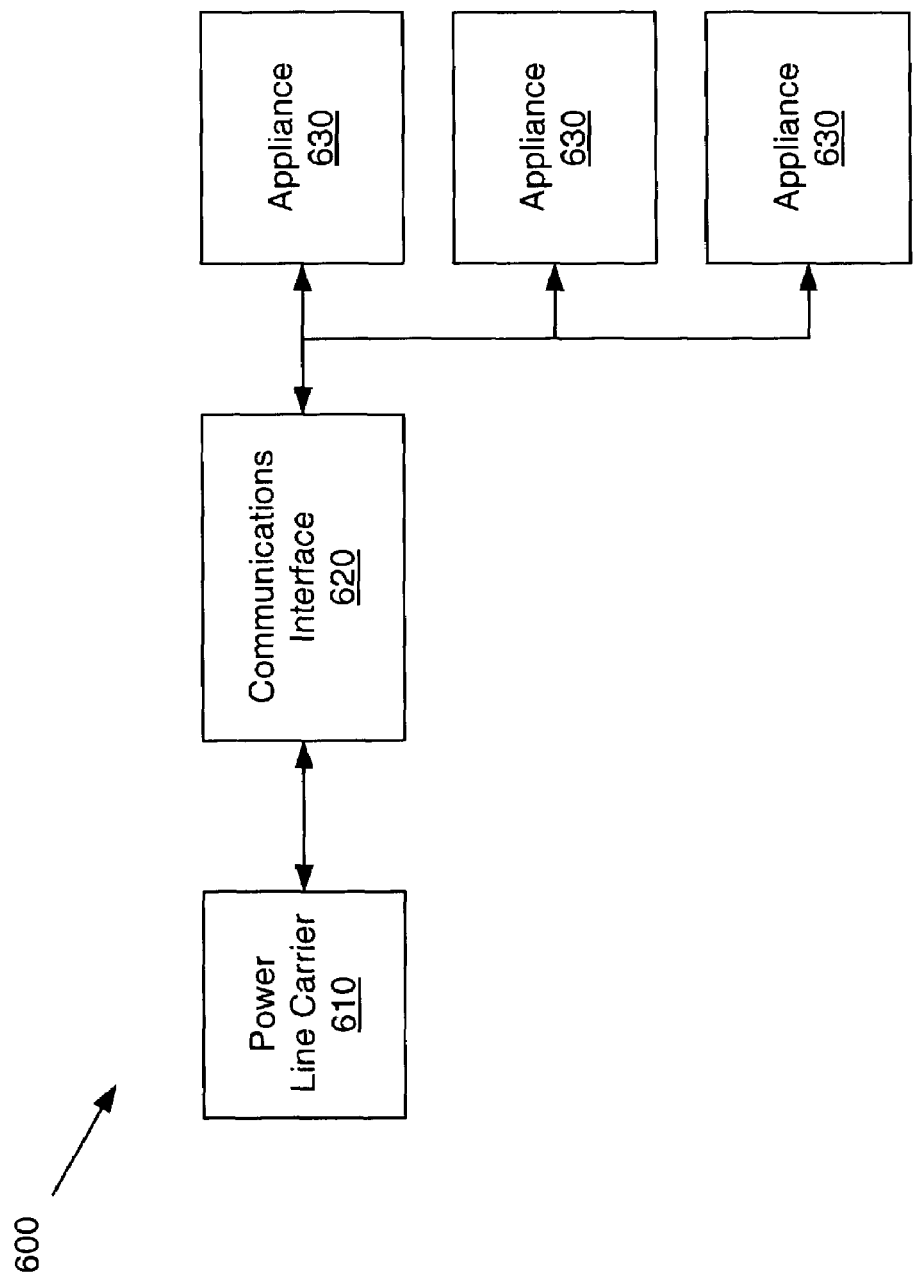
FIG. 6 illustrates a system for interfacing between a power line and an appliance.

In an alternative embodiment, the ACC 120 may be implemented as a communication interface between a power line carrier and an appliance. FIG. 6 illustrates an appliance communication system 600 for connecting a power line carrier and an appliance. The communication system 600 includes a communications interface 620 that provides for bidirectional transmission of data between a power line carrier (PLC) 610 and at least one appliance 630. The appliance 630 may be, as examples, a refrigerator, microwave oven, convection oven, stove, heating system, or cooling system. The PLC 610 may be, as examples, 120 volt (120V) AC (alternating current) power or 240 volt (240V) AC power.

Figure 7:
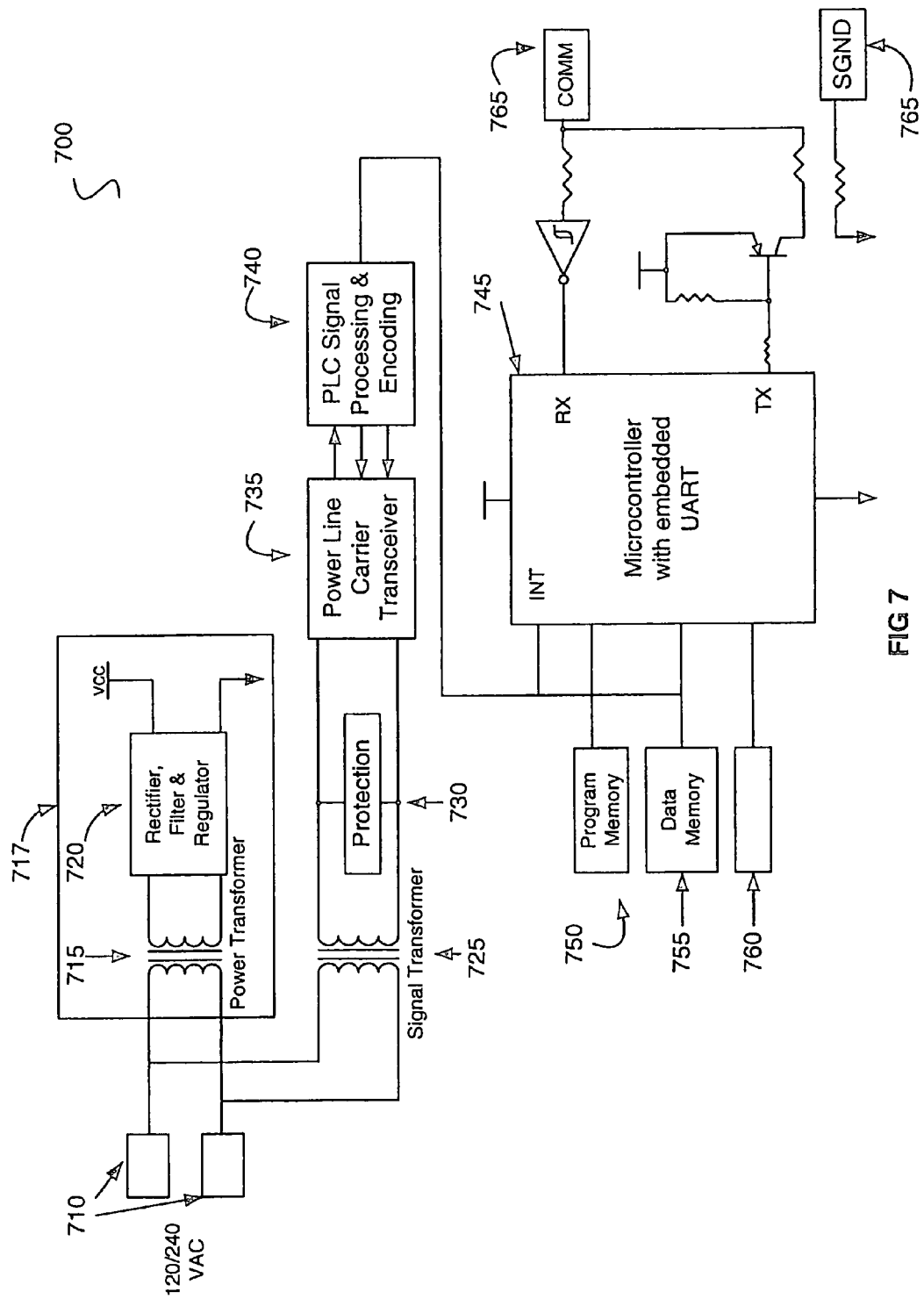
FIG. 7 shows a communications interface between an appliance and a power line carrier communication system.

A detailed diagram of the communications interface 620 is shown in FIG. 7. In particular, FIG. 7 shows a communications interface 700 between an appliance and a power line carrier communication system. The communications interface 700 includes two connections 710 for 120V or 240V AC power lines. The communications interface 700 also includes a transformer based power supply 717. As shown, the transformer based power supply 717 includes a transformer 715 and a rectifier, filter and regulator 720. The communications interface 700 also includes a signal transformer 725 and protector 730. The communications interface 700 further includes a power line carrier (PLC) transceiver 735 and a PLC signal processing and encoding unit 740 (PLC signal processor). The communications interface 700 includes a microcontroller 745. The communications interface 700 may also include a program memory 750, a data memory 755, and a clock 760. The communications interface 700 further includes connections 765 for appliance communication. In one embodiment, one of the connections is a signal (COMM) connection and the other connection is a signal ground (SGND) connection.

The transformer 715 may be implemented as a power transformer such as that manufactured by Signal. The rectifier, filter and regulator 720 may be implemented as rectifiers such as a Texas Instruments 1N4004, filter capacitors such as Rubicon 4700 uF capacitor and a Toshiba 78M05 regulator. The signal transformer 725 may be implemented as a toroidal signal transformer such as those made by Signal. The protector 730 may be implemented as a gas tube as manufactured by Siemens. The PLC transceiver 735 may be implemented as an integrated circuit such as those manufactured by Phillips. The PLC signal processing and encoding unit 740 may also be implemented as an integrated circuit such as those manufactured by Phillips. The microcontroller 745 may be a Hitachi H8-3644, as an example.

In one embodiment, the communications interface 700 includes four connections 710, 765. Two connections 710 couple to an AC power line (e.g., 120V or 240V) that provides a power line carrier channel. A transformer based power supply 717 is connected to the connections 710. The transformer based power supply 717 includes a power transformer 715 and a rectifier, filter and regulator 720 and generates logic level supplies for electronic signal processing and logic. The transformer based power supply 717 also provides electrical isolation of electronic signal processing and logic from the AC power line. Alternative embodiments may use galvanically isolated switching power supplies or low cost resistive or capacitive dropping power supplies that provide different amounts of electrical isolation.

The connections 710 also connect to a signal transformer 725. The signal transformer 725 couples a modulated carrier frequency signal from the connections 710 to a PLC transceiver 735. A line protector 730 provides electrical isolation of the rest of the system from the AC line. In an exemplary embodiment, the line protector 730 is located between the signal transformer 725 and the PLC transceiver 735. Transmission between the PLC transceiver 735 and the PLC signal processor 740 is generally bidirectional, but may be unidirectional in certain applications.

The output of the PLC signal processor 740 feeds a microcontroller 745. In certain embodiments, the PLC signal processor 740 and the microcontroller 745 may comprise a single device. In an alternative embodiment, the PLC signal processor 740 and the microcontroller 745 may be separate devices. In one embodiment, the communication processor 745 includes a general purpose universal asynchronous receiver transmitter (UART) that communicates with the appliance through a communications channel connected by the connections 765. In another embodiment, the UART establishes bidirectional communication with the appliance communications channel, for example, by disabling the transmitter to a high impedance state when it is not transmitting.

The communication processor 745 generally includes a program memory 750 that stores instructions for execution by the processor. The communication processor 745 may also include a data memory 755 that, for example, buffers messages. The program memory 750 and data memory 755 may work together to buffer messages and translate between a power line carrier communication protocol and an appliance protocol (such as a serial bus).

Figure 8:
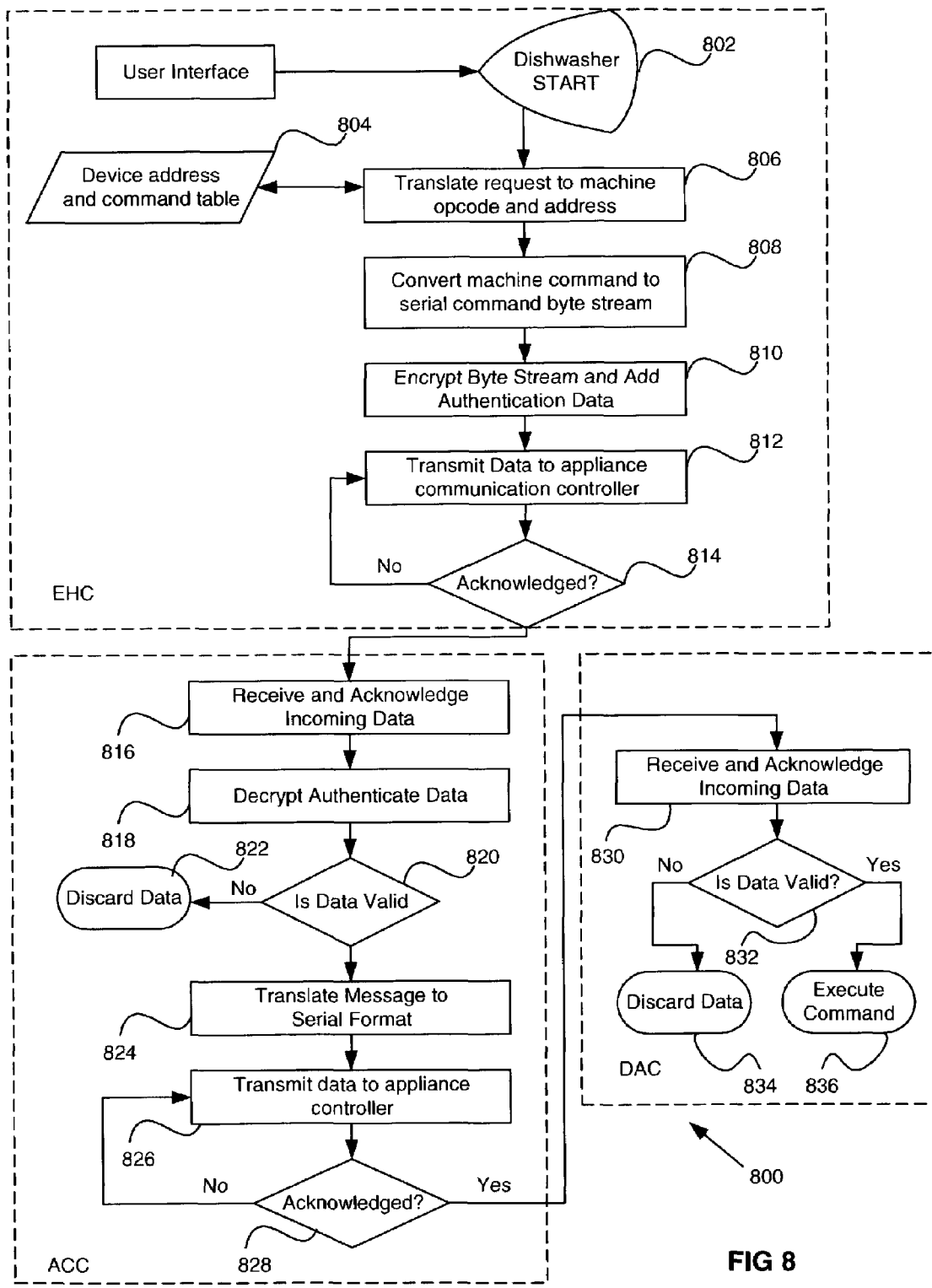
FIG. 8 shows a flow diagram of a method for translating between a power line carrier communication protocol and an appliance communication protocol.

FIG. 8 shows a flow diagram of a method 800 for translating between a power line carrier communication protocol and an appliance communication protocol. In one embodiment, the user runs an application on the EHC 130 which has been developed to manipulate the appliances within the home. In an alternative embodiment the user application runs on a remote system which will have a communications link to the EHC 130. The user selects the appropriate command (e.g., Dishwasher START) 802 using the EHC 130. The EHC 130 through its application program, interprets the request and obtains the machine specific command from the device information table 804. Once the appropriate command has been obtained (806) from the table 804, the EHC 130 generates a message packet including the machine command and device address (step 808). The EHC 130 will further apply authentication data and encrypt (810) the data prior to transmission of the message packet to the ACC. The EHC 130 converts the encrypted data to electrical signals and transmits (812) the electrical signals via the PLC communication link. The EHC 130 monitors the transmission of the data packet to the ACC and checks (814) for an acknowledgment that the data has been received correctly by the ACC. If the acknowledgment is not received in the time frame specified by the communication protocol, the data will be retransmitted by the EHC 130.

In an exemplary embodiment, the ACC accepts and acknowledges the incoming data transmission from the EHC 130. In doing so the electrical signals will be converted (816) back to a logical data packet. The ACC then employs the appropriate algorithms to decrypt and authenticate (818) the received data packet. In circumstances where the ACC is not able to authenticate the data packet, or finds the data packet to be invalid (820), the data packet will be discarded (822) and a request for a retransmission may be sent back to the EHC 130. Following a successful authentication of a data packet by the ACC, the ACC will reformat (824) the data for serial transmission. The data is then converted to electrical signals and transmitted (826) via the serial bus. The ACC monitors (828) the transmission of the data packet to the DAC and monitors for acknowledgment of the data being received correctly.

At the receiving end of the communication line, the digital appliance controller (DAC) converts the electrical signals from the ACC to logical information. Once the DAC has accepted (830) the logical signals and has confirmed (832) the validity of the data, an acknowledgement is transmitted back to the ACC to complete the data exchange. The DAC then interprets the data within the data packet. If the data contains a valid command then the DAC will execute (834) the machine command accordingly. If the command is determined not to be valid then the request is discarded (836).

Figure 9:
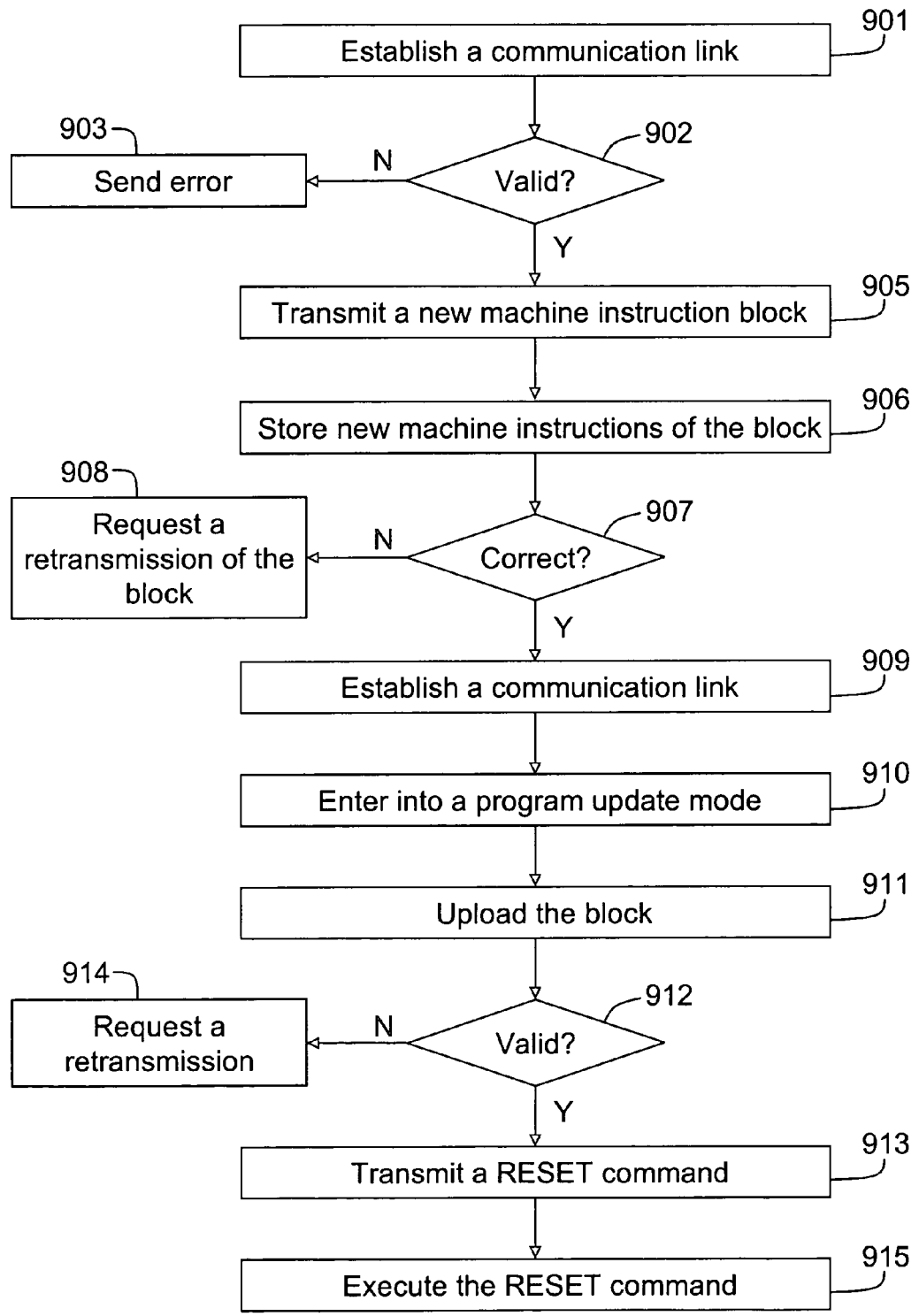
FIG. 9 presents a flow diagram of a method for reconfiguring an appliance.

FIG. 9 presents a flow diagram of a method for reconfiguring an appliance. To reconfigure a machine, a new machine instruction block is transmitted from the EHC 130 to the DAC 110. The user requesting to reconfigure the machine has access to either an application program that generates the new machine instructions or a machine manufacturer generated machine code file containing the new machine instructions (e.g., the machine instructions 900, "Super-Clean Wash Cycle"). The EHC 130 send messages to the ACC 120 and DAC 110 to reconfigure the appliance.

The application software described previously may generate the upgrade messages at the EHC 130. Upgrade messages may also be generated by an external remote system 170 and sent to the EHC 130. Exemplary reconfigurations include new wash cycles, custom cooking cycles/recipes, heating/cooling cycles, additional diagnostic commands and tests, and the like. To execute a machine reconfiguration, the EHC 130 establishes (901) a communication link to the appropriate ACC 120. The ACC 120 validates 902 the request employing the authentication protocols shown in FIG. 8. Once the reconfiguration request has been validated, the EHC 130 transmits (905) the new machine instruction block to the ACC 120. If the reconfiguration request is not see as valid request, the ACC 120 will return (903) an error response to the EHC 130.

During the machine instruction block transfer process to the ACC 120, the new instructions will be stored (906) into one of the memory pages shown in FIG. 4, for example. A pointer will also be incremented to retain the location of the most recent information loaded into the memory page thereby monitoring the progress of the instruction transfer. In case of a data transmission error, the pointer can be used to identify where in the machine instruction block the data transmission should resume. The progress information is transmitted back to the EHC 130 as part of an error recovery protocol. Following the completion of the downloading of the machine instruction block to the ACC 120 the ACC verifies (907) the data is correct via a CRC, checksum, or other error checking mechanism. If the machine instruction block is found to be in error, the ACC 120 requests (908) a retransmit of the machine instruction block by the EHC 130. Otherwise, the ACC 120 establishes (909) a communication link to the DAC. The communication may follow the protocol outlined in FIG. 11, for example.

Once the communication link is established between the ACC 120 and DAC 110, the ACC 120 will request for the DAC 110 to enter (910) into the program update mode. Once the DAC 110 has acknowledged that it has transitioned to the program update mode, the ACC 120 uploads (911) the new machine instruction block to the DAC. During the upload procedure, the ACC 120, in one embodiment, employs a pointer which will be incremented to retain the location of the most recent information loaded from the ACC memory page. In case of a data transmission error, the pointer may be used to identify where in the machine instruction block the data transmission should resume from to minimize excessive data transmission.

Following the completion of the machine instruction block transmission, the DAC 120 will verify (912) the validity of the data via CRC, checksum, or the like. If an error is detected within the machine instruction block, a retransmit request will be sent (914) back to the ACC 120 to resend the machine instruction block. Upon verification for the data being valid, the DAC 110 acknowledges the transmission to the ACC 120. The ACC 120 then transmits (913) a RESET command to the DAC. By executing (915) the RESET, the DAC will terminate the program upload mode and the new instructions will be available on the machine for the user as manifested by additional appliance functionality, test procedures, and the like, depending on the nature of the update.

While the invention has been described in terms of various specific embodiments, those skilled in the art will recognize that the invention can be practiced with modification within the spirit and scope of the claims.

What is claimed is:

1. A reconfigurable appliance control system comprising:
a dedicated appliance controller for controlling operation of an appliance;
a appliance communication controller coupled to the appliance over an appliance communication connection, wherein said appliance communication controller configured to determine whether said dedicated appliance controller is in a program update mode before reprogramming said dedicated appliance controller, and the appliance reprogrammed during the program update mode, wherein said appliance communication controller configured to monitor progress of an instruction transfer from said appliance communication controller to said dedicated appliance controller by employing a pointer that identifies an instruction within a machine instruction block, and wherein said appliance communication controller configured to resume transmitting the machine instruction block to said dedicated appliance controller starting from the identified instruction within the machine instruction block upon receiving a retransmit request transmitted after detecting an error during transmission of the machine instruction block; and
an external host controller coupled to the appliance communication controller over a host communication connection, the external host controller communicating an upgrade message for the appliance to the appliance communication controller.

2. The system of claim 1 wherein the host communication connection comprises a power line carrier communication connection.

3. The system of claim 1 wherein the appliance communication connection comprises a serial appliance communication connection.

4. The system of claim 1 wherein the dedicated appliance controller includes reprogrammable appliance control software.

5. The system of claim 1 wherein the dedicated appliance controller includes a scheduler.

6. The system of claim 1 wherein the dedicated appliance controller includes an external interface to appliance sensors.

7. The system of claim 1 wherein the dedicated appliance controller comprises:
reprogrammable main appliance control software; and
a central processing unit.

8. The system of claim 7 further comprising:
an external interface controller;
a communication controller; and
display and user input circuitry.

9. The system of claim 1 wherein the appliance communication controller comprises:
a communication processing unit;
an upgrade processing unit;
a command interpreter;
a communication port for communication with the dedicated appliance controller; and a communication port for communication with the external host controller.

10. The system of claim 1 wherein the appliance communication controller interprets commands transmitted from the external host control into a native appliance command set.

11. The system of claim 1 wherein the upgrade message is a dedicated appliance controller upgrade message.

12. The system of claim 1 wherein the appliance communication controller tracks statistics from the dedicated appliance controller.

13. The system of claim 1 wherein the appliance communication controller is a master appliance communication controller and the dedicated appliance controller is a slave dedicated appliance controller.

14. The system of claim 1 wherein the external host controller comprises:
   an encryption authentication module for authenticating data transmissions;
   an external communication connection for communicating with a remote system;
   a communication connection for communicating with the at least one appliance communication controller;
   a communication processing unit; and
   an external application layer for transmitting data to the at least one appliance communication controller.

15. The system of claim 14 wherein the external application layer comprises remote operation software.

16. The system of claim 14 wherein the external application layer comprises diagnostic software.

17. The system of claim 14 wherein the external application layer comprises upgrade software.

18. The system of claim 14 wherein the external communication connection comprises an Internet connection to a remote system.

19. A method for reconfiguring an appliance control system, the method comprising:
   generating an upgrade message from an external host controller;
   transmitting the upgrade message to an appliance communication controller;
   reprogramming a dedicated appliance controller using the upgrade message;
   controlling an appliance via the dedicated appliance controller;
   determining whether the dedicated appliance controller is in a program update mode before said reprogramming the dedicated appliance controller, wherein the appliance is reprogrammed during the program update mode;
   monitoring progress of an instruction transfer from the appliance communication controller to the dedicated appliance controller by employing a pointer that identifies an instruction within a machine instruction block; and
   resuming transmitting the machine instruction block to the dedicated appliance controller starting from the identified instruction within the machine instruction block upon receiving a retransmit request transmitted after detecting an error during transmission of the machine instruction block.

20. The method of claim 19 wherein transmitting further comprises transmitting the upgrade message to an appliance communication controller using a power line carrier.

21. The method of claim 19 further comprising transmitting the upgrade message to a dedicated appliance controller.

22. The method of claim 21 wherein transmitting to a dedicated appliance controller further comprises transmitting via a serial communication bus.

23. The method of claim 19 wherein transmitting an upgrade message comprises transmitting a dedicated appliance controller upgrade message.

24. A method for remotely reconfiguring an appliance, the method comprising:
   generating an upgrade message at a remote system;
   transmitting the upgrade message from the remote system to an external host controller in a building housing the appliance;
   transmitting the upgrade message from the external host controller to a dedicated appliance controller via an appliance communication controller;
   upgrading the dedicated appliance controller using the upgrade message;
   determining whether the dedicated appliance controller is in a program update mode before reprogramming the dedicated appliance controller, wherein the appliance is reprogrammed during the program update mode;
   monitoring progress of an instruction transfer from the appliance communication controller to the dedicated appliance controller by employing a pointer that identifies an instruction within a machine instruction block; and
   resuming transmitting the machine instruction block to the dedicated appliance controller starting from the identified instruction within the machine instruction block upon receiving a retransmit request transmitted after detecting an error during transmission of the machine instruction block.

25. The method of claim 24 wherein the upgrade message is transmitted to the appliance communication controller from the external host control using a power line carrier system.

26. The method of claim 24 wherein the upgrade message is transmitted to the dedicated appliance controller from the appliance communication controller using a serial connection.

27. The method of claim 24 wherein the upgrade message is transmitted from the remote system to the external host controller using an Internet connection.

28. The method of claim 19 further comprising reprogramming the dedicated appliance controller upon determining that the dedicated appliance controller is in the program update mode.

29. The system of claim 1 wherein said dedicated appliance controller is located within the appliance.

30. The system of claim 1 wherein an error during transmission of a machine instruction block is detected using one of a cyclic redundancy check (CRC) and a checksum test.

* * * * *